United States Patent
Nakano et al.

(10) Patent No.: US 8,062,158 B2
(45) Date of Patent: *Nov. 22, 2011

(54) TIMING CHAIN DRIVE UNIT

(75) Inventors: Yoshikazu Nakano, Osaka (JP); Shunji Sakura, Osaka (JP); Kohei Kunimatsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 412 days.

This patent is subject to a terminal disclaimer.

(21) Appl. No.: 12/328,090

(22) Filed: Dec. 4, 2008

(65) Prior Publication Data

US 2009/0170648 A1    Jul. 2, 2009

(30) Foreign Application Priority Data

Dec. 26, 2007   (JP) ................................. 2007-333955

(51) Int. Cl.
*F16H 55/30*   (2006.01)
(52) U.S. Cl. ......................... 474/141; 474/160; 474/162
(58) Field of Classification Search .................. 474/141, 474/160, 162
See application file for complete search history.

(56) References Cited

U.S. PATENT DOCUMENTS

| 7,125,356 B2 * | 10/2006 | Todd .............................. 474/152 |
| 7,654,925 B2 * | 2/2010 | Todd .............................. 474/152 |
| 7,691,020 B2 * | 4/2010 | Sakura et al. ................. 474/156 |
| 2005/0119079 A1 * | 6/2005 | Okabe ........................... 474/155 |
| 2006/0240925 A1 * | 10/2006 | Todd ............................. 474/156 |
| 2007/0066430 A1 * | 3/2007 | Gajewski ...................... 474/141 |
| 2010/0137085 A1 * | 6/2010 | Nakano et al. ................ 474/155 |
| 2010/0160098 A1 * | 6/2010 | Sonoda et al. ................ 474/101 |

FOREIGN PATENT DOCUMENTS

| DE | 10 2005 008 676 A1 | 6/2006 |
| JP | 2003184996 A | 7/2003 |
| JP | 2003214504 A | 7/2003 |
| JP | 2007506043 A | 3/2007 |

* cited by examiner

*Primary Examiner* — Sang Kim
(74) *Attorney, Agent, or Firm* — Howson & Howson LLP

(57) ABSTRACT

In a timing chain drive unit the tooth pitch of a driven sprocket from which a tension span of the chain travels toward a driving sprocket varies cyclically around the circumference of the driven sprocket and cyclically increases and decreases the length of the tension span in synchronism with load variations imparted to the driven sprocket by a valve-operating camshaft.

2 Claims, 6 Drawing Sheets

TIMING CHAIN DRIVE UNIT

CROSS-REFERENCE TO RELATED APPLICATION

This application claims priority on the basis of Japanese patent application 2007-333955, filed Dec. 26, 2007. The disclosure of Japanese application 2007-333955 is hereby incorporated by reference.

FIELD OF THE INVENTION

The invention relates to a timing chain drive unit in which a predetermined drive ratio is maintained between a driving sprocket and a driven sprocket connected in driving relationship by an endless chain. The invention relates more particularly to the reduction of the influence of changes in tension in a timing chain, and to the reduction of vibration and noise in a timing drive.

BACKGROUND OF THE INVENTION

As shown in FIG. 5, a timing chain drive unit 500, in a dual overhead cam (DOHC) internal combustion engine, transmits power, by means of a chain CH, from a driving sprocket 550 to driven sprockets 560 and 570. A pivoted slack-side chain guide, in sliding contact with a part of the chain CH that travels from the driving sprocket 550 to driven sprocket 560, cooperates with a tensioner T to apply appropriate tension to the chain. A tension-side chain guide 510 is in sliding contact with a portion of the chain that travels from driven sprocket 570 to the driving sprocket to prevent vibration and lateral movement of the chain. Guide 510 controls the length of the span of the chain extending from the point at which the chain disengages the driven sprocket 570 to the point at which the chain engages the driving sprocket 550.

The slack side chain guide 540 is pivotably mounted on a pivot shaft P, which can be a mounting bolt, a mounting pin, or the like, fixed to, and extending from, a wall of the engine E. The tensioner T biases a shoe on the pivoted slack side chain guide 540 against the chain. Whereas the slack side chain guide 540 is pivoted, the tension-side chain guide 510 is immovably fixed to the engine E by mounting bolts Q or other suitable mounting devices.

Further details of the typical timing chain drive unit of the kind described above can be found in Japanese Laid-Open Patent Publication No. 2003-214504.

In the conventional timing chain drive unit, the operation of the engine valves causes the load applied by the camshafts to their sprockets, and through the sprockets to the chain, to change cyclically in synchronization with the rotation of the camshafts and the crankshaft. These cyclic load changes result in corresponding cyclic changes in tension in the tension side of the chain, that is, the span of the chain traveling from the driven sprocket 570 toward the driving sprocket 550. The cyclic changes in load and in chain tension depend on various factors, including the rate of rotation of the crankshaft.

These cyclic changes in load and chain tension are generated as a result of forces required to open the intake and exhaust valves. In the case of an in-line four cylinder engine, the change in tension goes through four cycles for each rotation of a camshaft. In an in-line six cylinder engine, the change in tension goes through six cycles for each rotation of a camshaft.

The chain must have a tensile strength capable of withstanding the peak value of the varying chain tension. Accordingly, conventional timing chains are excessively heavy, the overall weight of the drive unit is high, and excessive noise is generated. Thus, the conventional timing chain drive unit is not well adapted to demands for size reduction, weight reduction and noise reduction in internal combustion engines.

Attempts to address the problems caused by cyclic variations in chain tension have included the use of non-circular sprockets, and sprockets having tooth gap bottoms located at varying radial distances from the sprocket axis. These approaches are described in United States patent publication 2007/0066430 and in U.S. Pat. No. 7,125,356. However, in the case of a non-circular sprocket or a sprocket having a varying tooth gap bottom radius, a force is applied to the chain in a direction perpendicular to its direction of travel, causing a corresponding displacement of the chain, and generating increased noise due to the vibration of the chain and impact between the chain and its chain guide.

SUMMARY OF THE INVENTION

The timing chain drive unit comprises a driving sprocket, a driven sprocket, and a chain in mesh with both sprockets and having a span traveling from the driven sprocket to the driving sprocket. This span of the chain is in tension, and transmits rotation from the driving sprocket to the driven sprocket at a predetermined speed ratio. At least one of the sprockets tends to impart a cyclically varying load to the above-mentioned span of the chain. At least one of the sprockets, but not necessarily the same one that tends to impart a cyclically varying load, has sprocket teeth the pitch of which cyclically increases and decreases over the circumference thereof in synchronism with the cyclic variation in load. If the driven sprocket has a cyclically increasing and decreasing tooth pitch, the tooth pitch at the disengagement point on the driven sprocket is at a minimum when the cyclically varying load reaches its peak. If the driving sprocket has a cyclically increasing and decreasing tooth pitch, the tooth pitch at the engagement point on the driving sprocket is at a maximum when the cyclically varying load reaches its peak.

The driving sprocket can be a sprocket on an engine crankshaft, and the driven sprocket can be a sprocket on an engine valve-operating camshaft. In that case, the cyclic load variation is imparted to the chain by engine valves through the camshaft and the driven sprocket.

As the sprockets rotate, the pitch of the teeth on the driven sprocket at the point of disengagement, and/or the pitch of the teeth of the driving sprocket at the point of engagement, change continuously, causing a cyclic change in the length of the tension span of the chain traveling from the driven sprocket toward the driving sprocket. This changing in the length of the tension span reduces variations in tension in the chain caused by load variations imparted to the driven sprocket by the camshaft or other mechanism that it operates. In this way, load variations can be absorbed without lateral displacement of the chain and without applying a lateral force to the chain. Consequently, the overall timing chain drive unit is simplified, and can be made smaller and lighter in weight, and vibration and noise can be reduced.

When the sprocket tooth pitch increases and decreases circumferentially so that it varies cyclically at the disengagement point or at the engagement point at the same rate at which the cyclic load variations take place, the phase of the cyclic tooth pitch variations can be optimally synchronized with the load variations so that the load variations can be reliably absorbed. When the cyclic pitch variations are optimally synchronized with the load variations, the maximum tension applied to the chain is reduced, the size and weight of the chain can be reduced, and the useful life of the chain can be increased. In addition, noise and vibration due to the changes in tension can be reduced.

When the driven sprocket operates a camshaft for driving intake and exhaust valves of an engine, and the load variation is due to the operation of the camshaft, the reduction of changes in chain tension afforded by the invention enable the timing chain drive unit to be simplified and made smaller in size and weight. Thus, the engine as a whole can be made smaller and lighter in weight, and noise and vibration can be significantly reduced.

DETAILED DESCRIPTION OF THE PREFERRED EMBODIMENTS

In accordance with the invention, in a timing chain drive unit, the teeth of a driving sprocket, the teeth of a driven sprocket from which the chain travels toward the driving sprocket, or the teeth on both sprockets, are arranged at unequal intervals around the circumference of the sprocket. The arrangement of teeth, which will be described below, allows cyclic load changes to be absorbed without applying a lateral force to the chain, i.e., a force in any direction other than in the direction of travel of the chain. Consequently, the timing chain drive unit can have fewer movable components so that it can be structurally simple, smaller in size, and lighter in weight, than other timing chain drive units designed to address the problem of cyclic load variations. The invention decreases vibration and noise and can be realized in various embodiments.

Figure 1:
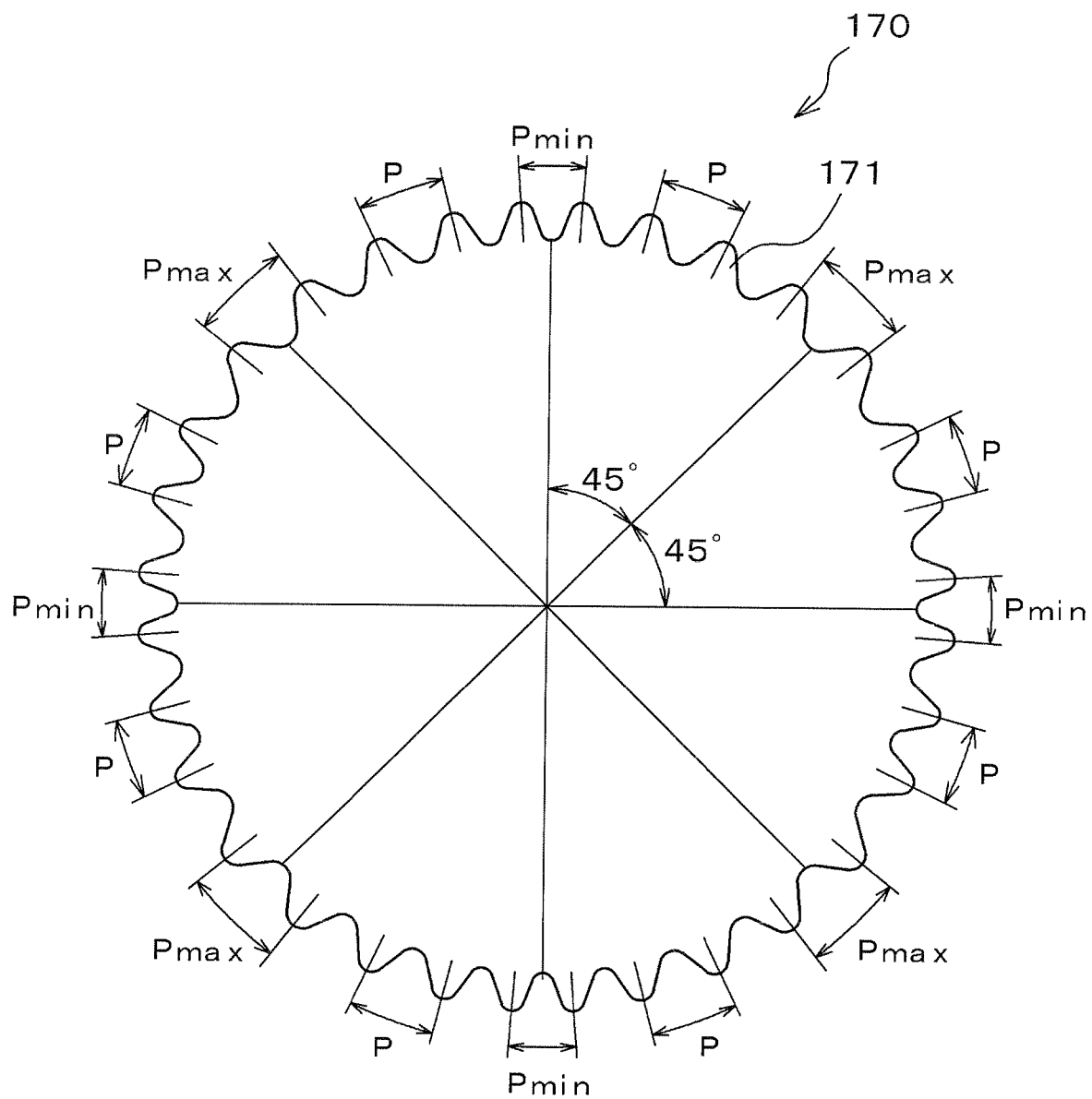
FIG. 1 is a schematic side elevational view of an engine timing sprocket according to the invention.
Figure 5:
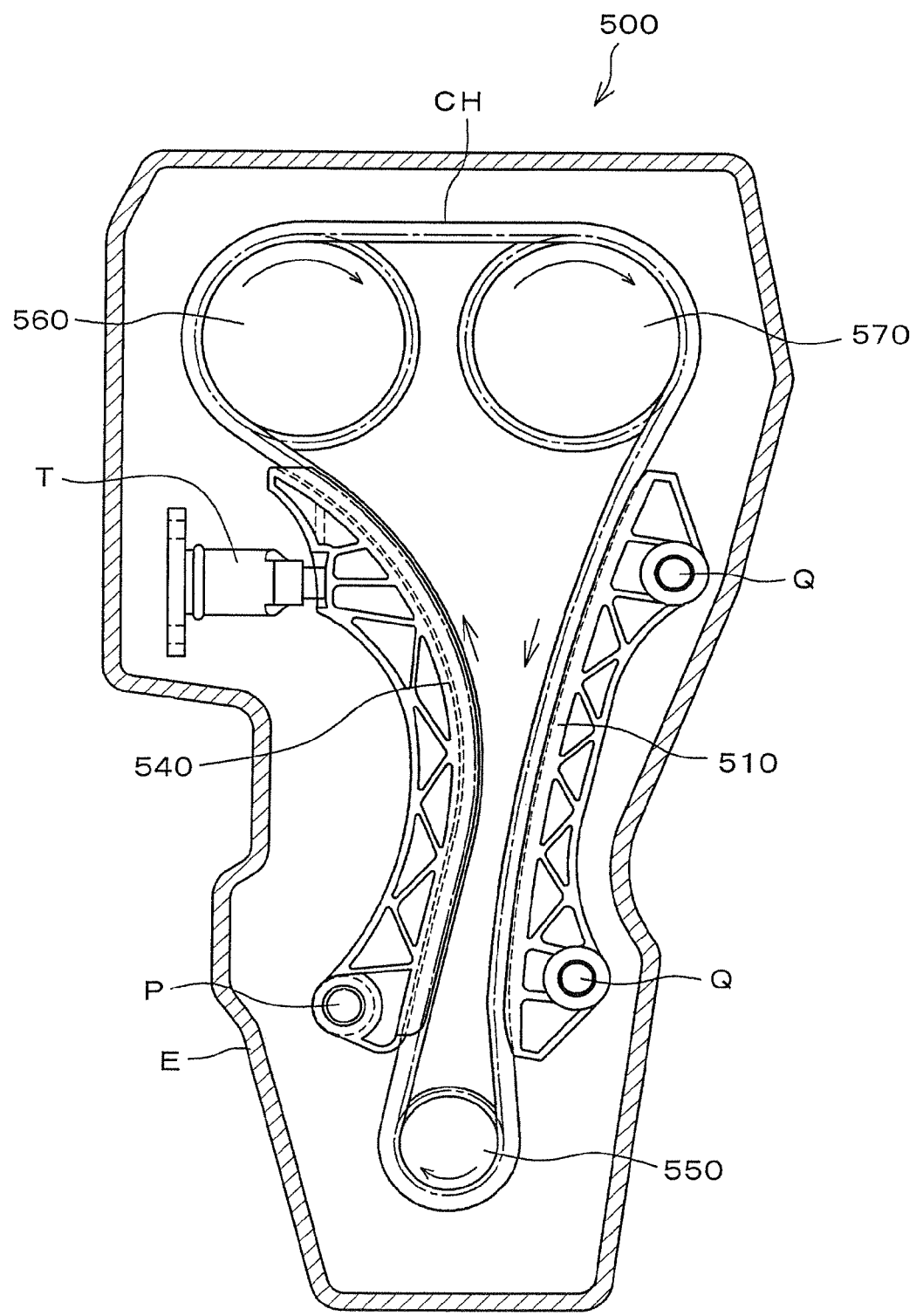
FIG. 5 is a schematic elevational view of a conventional timing chain drive unit.

FIG. 1 shows a sprocket of a timing chain drive unit according to one embodiment of the invention, the drive unit being adapted for use in an in-line, four cylinder, dual overhead cam (DOHC) engine. The sprocket 170 is the tension side camshaft sprocket, that is, the sprocket from which the chain travels toward the crankshaft sprocket. In such an engine, the load on the tension side of the chain, that is, the span of the timing chain extending from the tension side camshaft sprocket to the crankshaft sprocket, goes through four cycles for each 360 degrees of rotation of a camshaft. Except for the varying pitch of the camshaft sprocket teeth, as shown in FIG. 1, the configuration of the timing chain drive unit is the same as that of the conventional timing chain drive unit shown in FIG. 5.

The teeth of sprocket 170 are formed so that the load on the tension side of the chain is synchronized with the cyclic changes in the load that would be applied to the chain by a conventional sprocket having a uniform tooth pitch. The pitch P of the sprocket teeth varies through four cycles around the perimeter of the sprocket. The pitch P of the sprocket teeth 171 is the widest at Pmax and narrowest at Pmin. The locations of Pmax and Pmin are alternately disposed at intervals of 45 degrees around the perimeter of the sprocket 170. Therefore, as the sprocket rotates, the phases of the sprocket teeth 171, at the point at which the chain disengages from the chain, cyclically increase and decrease. The term "phase" or "sprocket phase" as used herein refers to the shift of the disengagement position relative to the disengagement position in the case of a conventional sprocket operated at the same speed.

The pitch variation of the sprocket teeth 171 is exaggerated in FIG. 1 for the purpose of illustration. In practice, in an in-line, four cylinder, DOHC engine in which the span of the tension side of the chain is 300 mm, Pmax and Pmin will be respectively above and below the conventional uniform pitch by about 0.2 mm. These small pitch variations do not materially affect engagement or disengagement of the chain.

As shown in FIGS. 2(a)-2(d), a chain CH is in mesh with a tension side driven sprocket 171, which rotates clockwise. The chain CH disengages from sprocket 170 at a disengagement point K.

The region Pmax, where the tooth pitch is widest, is schematically shown by a white section, and the region Pmin, where the tooth pitch is narrowest, is schematically shown by a black section. In this embodiment, the tooth pitch varies according to a sine function through four complete cycles as the sprocket goes through one full rotation. Thus, the tooth pitch is proportional to $P+K \sin 4\theta$, where P is the standard tooth pitch, K is a constant, and $\theta$ is the rotation angle of the sprocket. The formula, of course applies in the case of a four cylinder engine, and the tooth pitch may depart from the above-described sine relationship, depending on the shapes of the cam lobes.

Figure 2A:
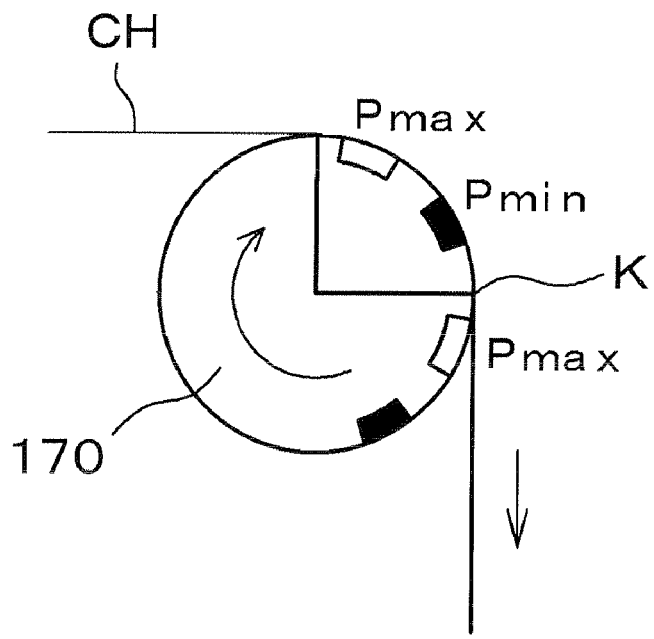
FIGS. 2(a)-2(d) are schematic views showing successive stages in the operation of the timing chain drive unit of the invention.

In FIG. 2(a) a point Pmax on the sprocket has passed through the disengagement point K, and the following point Pmin is approaching the disengagement point. At the disengagement point, therefore, the tooth pitch is decreasing from the condition illustrated in FIG. 2(d), where the tooth pitch at the disengagement point is maximum. In FIG. 2(a), the pitch of the sprocket teeth at the disengagement point K corresponds approximately to the standard tooth pitch, since the teeth having a wider pitch than the standard pitch have passed through the disengagement point. At this time, the rate of decrease in the tooth pitch at the disengagement point is near its maximum.

Figure 2B:
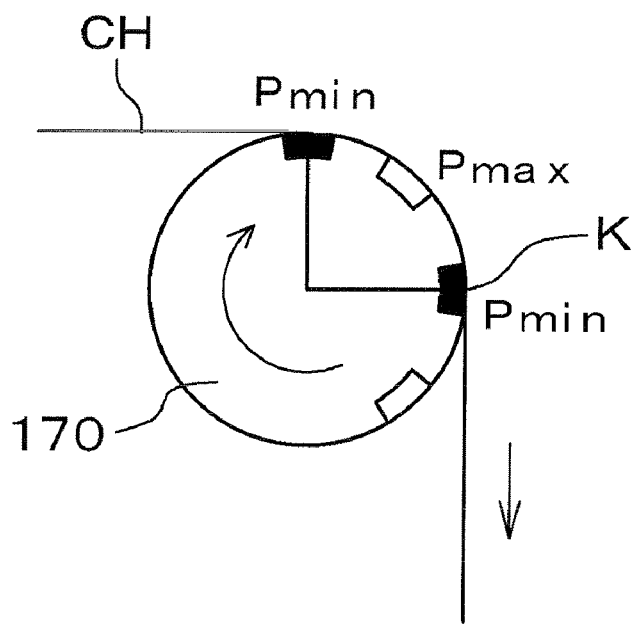

In FIG. 2(b), where the pitch Pmin is at the disengagement point, the pitch of the teeth at the disengagement point K is at a minimum. The rate of change of tooth pitch at this time is also at a minimum.

Figure 2C:
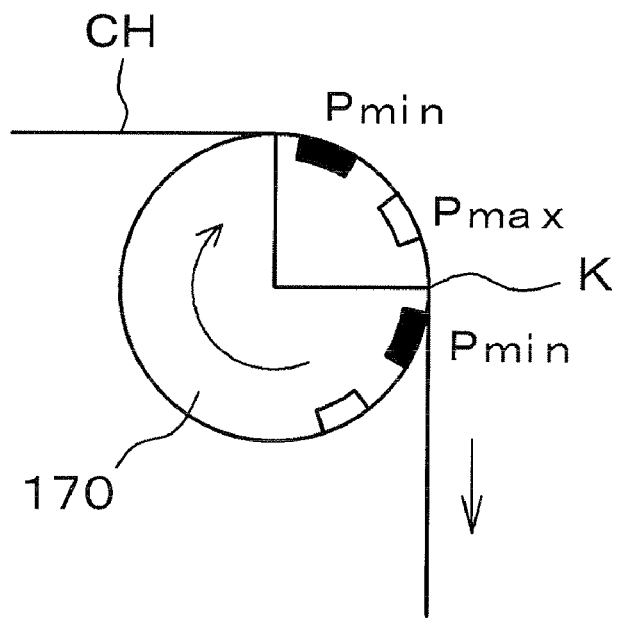

In FIG. 2(c) a point Pmin on the sprocket has passed through the disengagement point K, and the following point Pmax is approaching the disengagement point. At the disengagement point, therefore, the tooth pitch is increasing from the condition illustrated in FIG. 2(b). In FIG. 2(c), the pitch of the sprocket teeth at the disengagement point K again corresponds approximately to the standard tooth pitch, since the teeth having a narrower pitch than the standard pitch have passed through the disengagement point. Here, the rate of increase in the tooth pitch at the disengagement point is near its maximum.

Figure 2D:
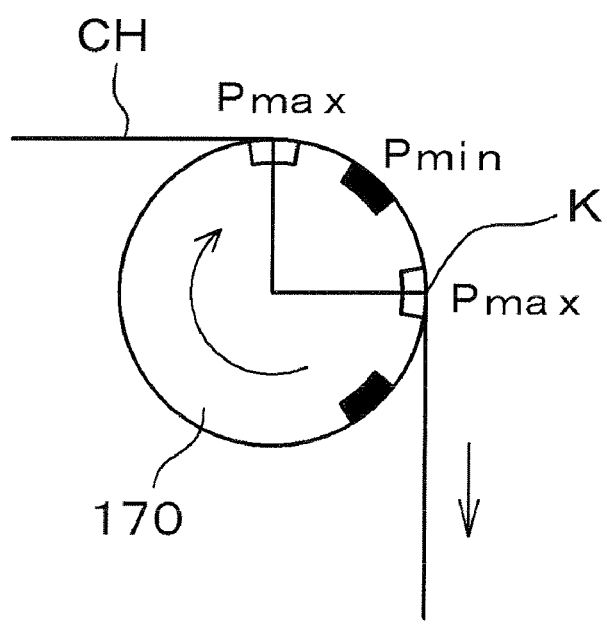

In FIG. 2(d) the tooth pitch at the disengagement point K is at a maximum, and the rate of change in tooth pitch is again at a minimum.

The cyclic variation in tooth pitch as illustrated in FIGS. 2(a)-2(d) causes a corresponding cyclic variation in the length of the span of chain CH between the driven sprocket

170 and the driving sprocket. The sprocket phase, lags the load by a phase delay of approximately 22.5 degrees of sprocket rotation.

Figure 3:
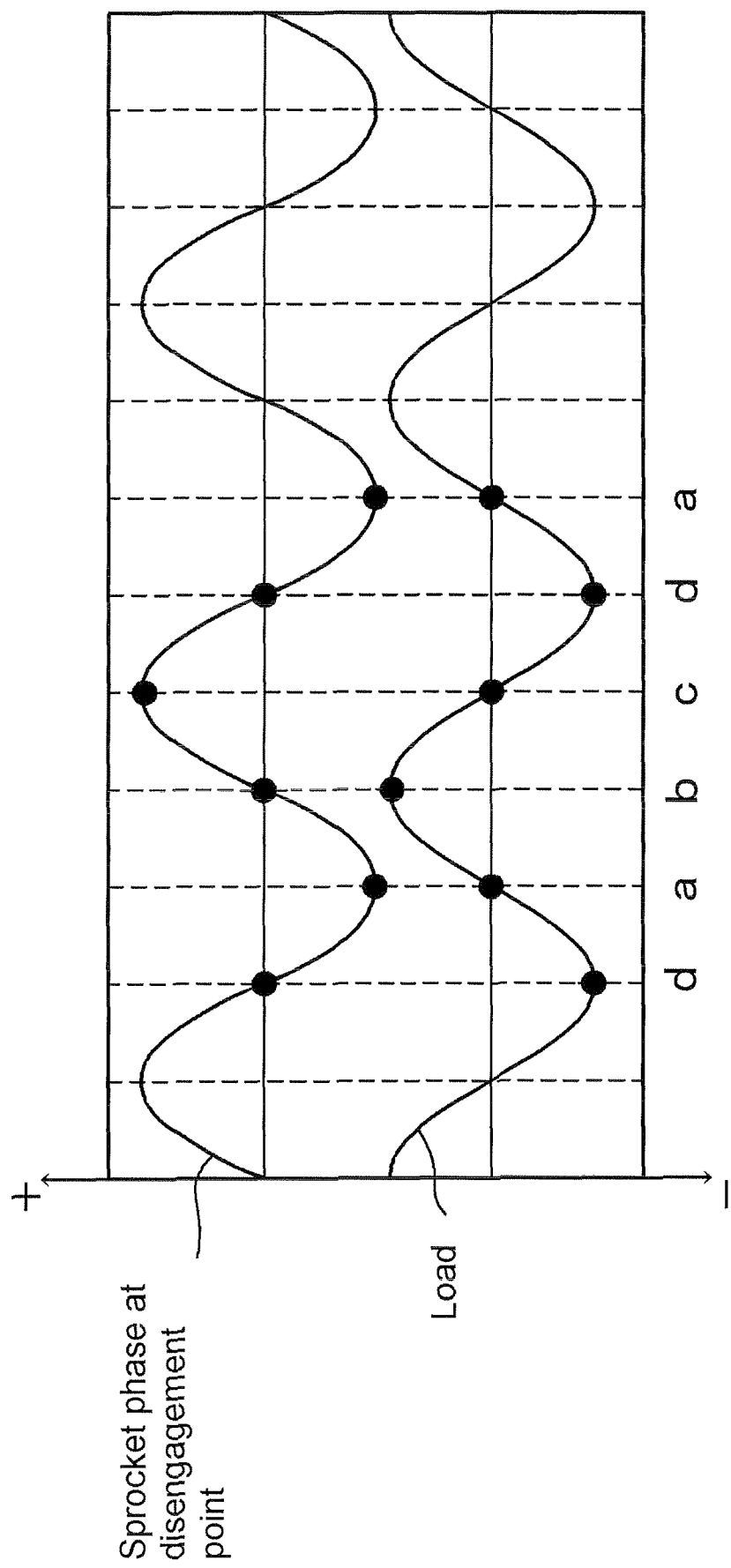
FIG. 3 is graphical plot showing the relationship between the phase of a sprocket tooth and the load on the chain during the operation shown in FIGS. 2(a)-2(d)

In FIG. 3, times a to d correspond respectively to the conditions illustrated in FIGS. 2(a) to 2(d). At time a, where the tooth pitch at the disengagement point K is between the maximum and minimum tooth pitch, the load that would be imparted to the tension span of the chain is at an intermediate level.

At time b, the engine camshaft tends to impart a maximum load to the tension span of the chain. At this time, the tooth pitch at the disengagement point K is at a minimum. Accordingly, the increased load can be balanced efficiently.

At time c, load is decreasing, and is at an intermediate level. At this time, the sprocket tooth pitch at the disengagement point is at an intermediate level between the maximum tooth pitch and the minimum tooth pitch. At time d, the load that the driven sprocket would impart to the tension span of the chain is at a minimum, and, at this time, the sprocket tooth pitch at the disengagement point K is at a maximum, a shown in FIG. 2(d).

Because the phase of the sprocket teeth and the load change are synchronized with each other in an optimum phase relationship, the load change can be efficiently absorbed without displacement or application of force to the chain in directions other than its direction of travel. The maximum tension of the chain is reduced, and the chain can be made smaller and lighter in weight. The overall timing chain drive unit can be simplified by keeping the number of moving parts at a minimum, and can also be made smaller and lighter in weight. Furthermore, noise due to vibration of the chain can be reduced.

Figure 4:
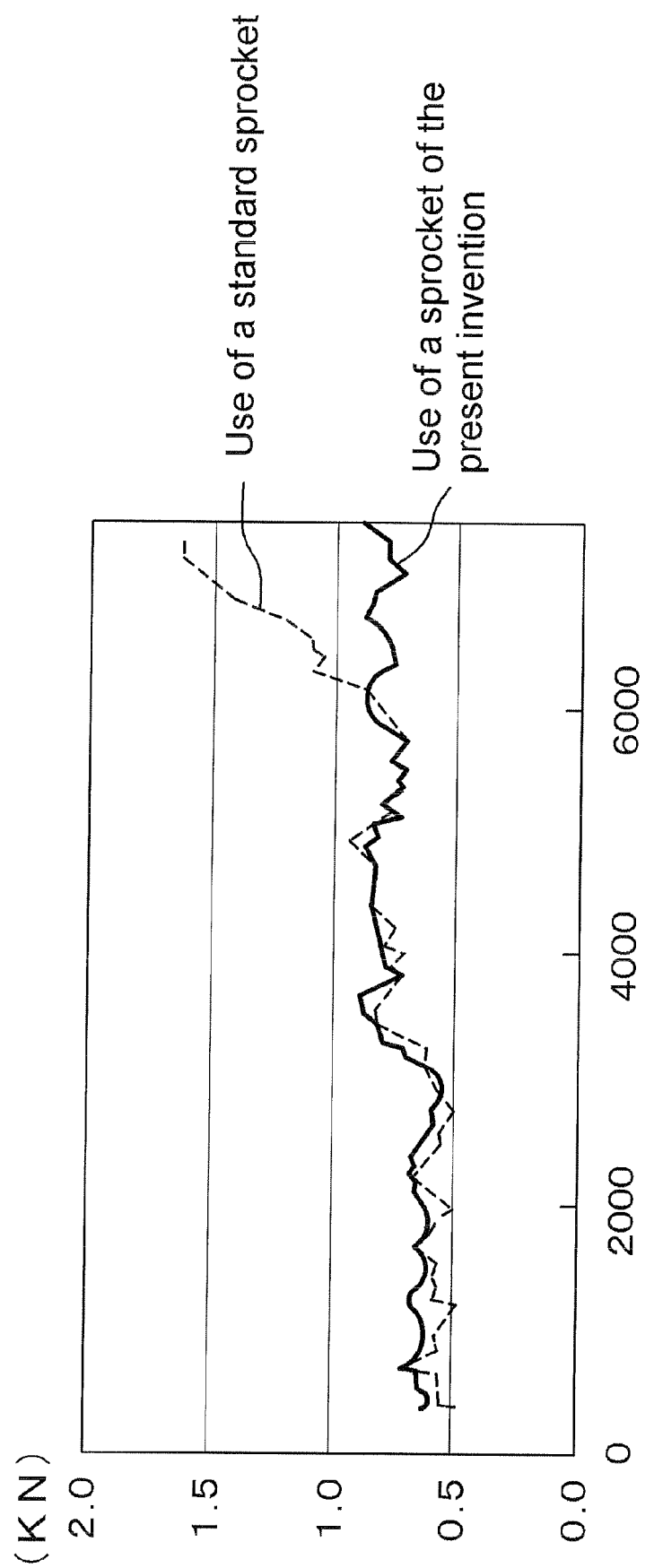
FIG. 4 is a graphical view comparing the results of experiments carried out on the timing chain drive unit of the invention and on a conventional timing chain drive unit.

FIG. 4, which depicts the results of experimental measurements of peak tension in kiloNewtons (kN) in a standard forty tooth sprocket, and a forty tooth sprocket of the invention, in an in-line, four cylinder engine. At low rates of revolution, the load changes imposed by the camshaft are absorbed in both cases by torsion in the camshaft, deflection of the chain guide, etc. Thus, the peak tension in the case of a standard sprocket and a sprocket according to the invention are substantially the same. However, at higher rates of rotation, e.g., rates higher than about 6000 rpm, other engine components are no longer able to follow the cyclic load changes. Peak chain tension in the case of a standard sprocket increases rapidly with increasing rotational speed, whereas, in the case of the sprocket according to the invention, the cyclic variation of pitch of the sprocket teeth allows the tension span of the chain to increase and decrease in length, in synchronism with the cyclic load changes so that the load change can be absorbed, and the large increase in peak tension does not occur at high rates of rotation.

The rates of rotation at which the effects of the invention are exhibited can be lower than 6000 rpm in some cases, depending on conditions such as the type and size of the engine and the sizes and arrangements of other components.

Significant aspects of the invention include the fact that it enables an engine to be operated more reliably at high rotational speeds and that it makes engine size and weight reduction possible. As is apparent from FIG. 4, the beneficial effects of the invention become increasingly pronounced as the rotation speed of the engine increases.

As mentioned previously, in the example described, the pitch variation of the sprocket teeth and the load variation imposed on by the driven sprocket are approximately sinusoidal. However, even where the actual load does not follow a sine curve, the sprocket phase at the disengagement point can be set to lag the load in the manner depicted in FIG. 3 so that the load variations in the tension span of the chain are reduced.

Furthermore, although in the example described, the sprocket in which the tooth pitch varies is a driven sprocket, the driving sprocket, i.e., the crankshaft sprocket, can also have a similar tooth pitch variation. In that case, the relationships between the locations of Pmax and Pmin and the engagement point of the chain with the driving sprocket are the opposite of the relationships between the locations of Pmax and Pmin and the disengagement point K on the driven sprocket. That is, the tooth pitch at the engagement point on the driving sprocket is at a maximum when the cyclically varying load reaches its peak. By synchronizing the tension in the chain with the changes in load using a tooth pitch variation, the invention controls chain tension without displacing the chain laterally and without applying a lateral force to the chain. As a result, vibration and noise, including resonant vibration, can be reduced.

What is claimed is:

1. A timing chain drive unit comprising a driving sprocket, a driven sprocket, and a chain in mesh with both sprockets and having a span traveling from the driven sprocket to the driving sprocket, said span being in tension and transmitting rotation from the driving sprocket to the driven sprocket at a predetermined speed ratio, and at least one said sprockets tending to impart a cyclically varying load to said span of the chain, wherein at least one of said sprockets has sprocket teeth the pitch of which, at the point at which said at least one of the sprockets meets said span of the chain, cyclically increases and decreases, as said at least one of the sprockets rotates, in synchronism with said cyclic variation in load, and wherein, if the driven sprocket has a cyclically increasing and decreasing tooth pitch, the tooth pitch at the disengagement point on said driven sprocket is at a minimum when said cyclically varying load reaches its peak, and if the driving sprocket has a cyclically increasing and decreasing tooth pitch, the tooth pitch at the engagement point on said driving sprocket is at a maximum when said cyclically varying load reaches its peak.

2. The timing chain drive unit according to claim 1, in which said driving sprocket is a sprocket on an engine crankshaft, said driven sprocket is a sprocket on an engine valve-operating camshaft, the cyclic load variation is imparted to said chain by engine valves through said camshaft and said driven sprocket.

* * * * *